UNITED STATES PATENT OFFICE.

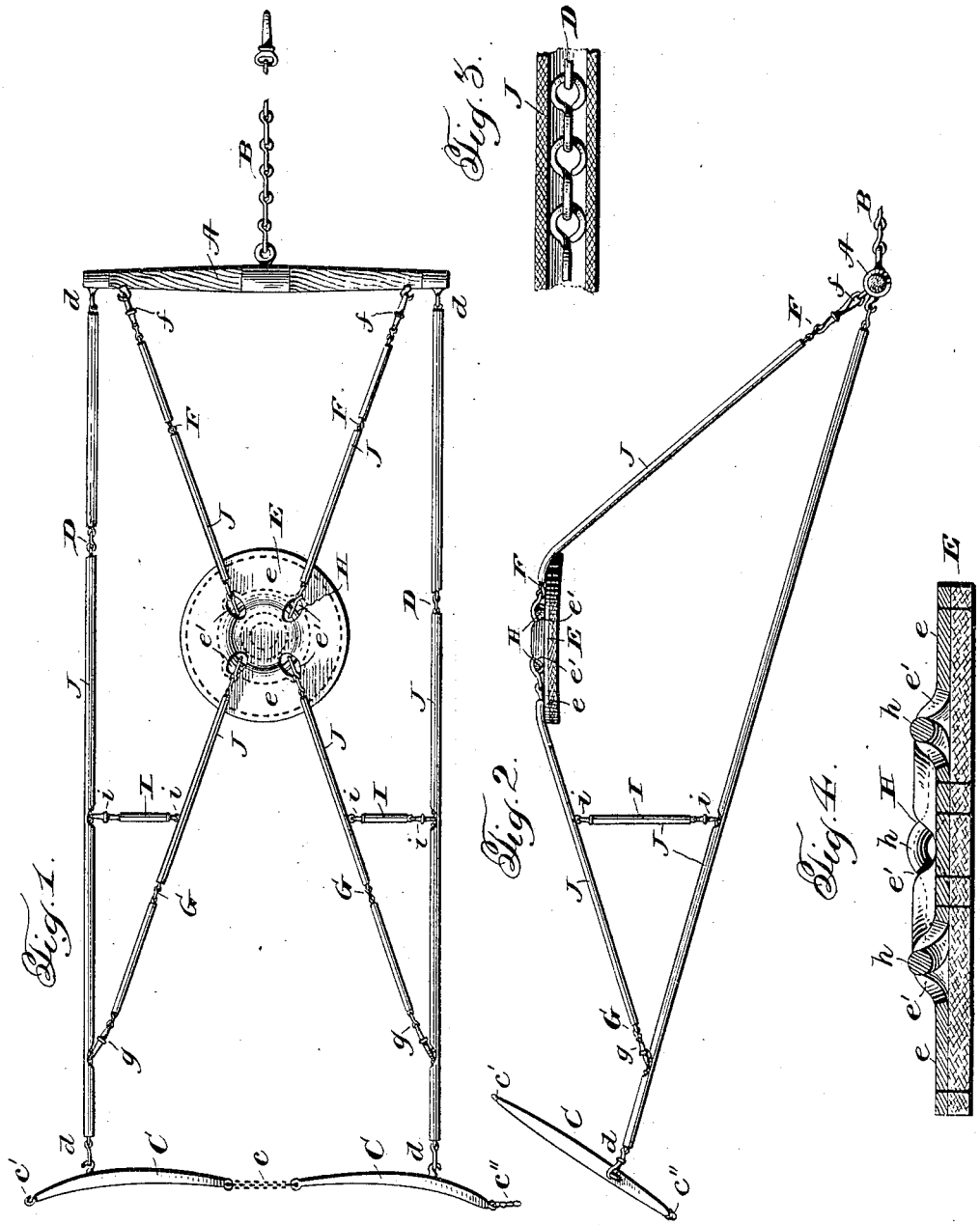

JOHN POEHLMAN, OF SPRINGFIELD, ILLINOIS.

MINING-HARNESS.

No. 830,802.  Specification of Letters Patent.  Patented Sept. 11, 1906.

Application filed November 25, 1905. Serial No. 289,138.

*To all whom it may concern:*

Be it known that I, JOHN POEHLMAN, a citizen of the United States, residing at Springfield, in the county of Sangamon and State of Illinois, have invented certain new and useful Improvements in Mining-Harness, of which the following is a specification, reference being had therein to the accompanying drawings.

This invention relates to improvements in harness, and particularly that type of harness designed for rough usage, such as encountered in mines or similar places, and has for its object the provision of such a harness which will be simple in construction, though adequate in strength to withstand rough usage and handling as also the damp unfavorable conditions of mines and the like, also one which may be quickly applied and removed from an animal and which may be readily repaired.

The novel features of the invention will be apparent from the detail description hereinafter contained when read in connection with the accompanying drawings, forming part hereof, and from the hereto-appended claims.

In the drawings, Figure 1 is a plan view of a harness constituting a convenient embodiment of the invention. Fig. 2 is a side elevation showing the relative positions the parts assume when applied to a mule or other animal. Fig. 3 is a detail sectional view through one of the chains and its covering, and Fig. 4 is a cross-sectional view of the back-pad.

Referring more specifically to the drawings, wherein like reference characters refer to corresponding parts in the several views, A designates a swingletree, which may be of any ordinary or preferred form; B, a centrally-disposed draft-chain or equivalent, and C the hames, flexibly connected at their upper ends by a chain *c* and adapted to be adjustably secured together at their lower ends through the medium of a hook *c'* and a chain *c''*. Running from the hames just referred to, one from each hame, are a pair of trace-chains D, extending rearwardly to the opposite ends of the swingletree A. These trace-chains are adjustably and detachably secured to the hames and swingletree by hooks *d*.

E is an approximately centrally-arranged back-pad, radiating from which are a series of chains which connect the same with the swingletree and trace-chains in a manner to support the harness upon the animal. These radiating chains include a pair of chains F, running rearwardly from the pad to the swingletree and adjustable in length and detachable with respect to said swingletree by means of double snap-hooks *f*, and a pair of similarly-disposed forwardly-extending chains G, running from the pad E to points adjacent to the connections intermediate the hames and the trace-chains D, where they are adjustably and detachably connected to said trace-chains through the medium of the double snap-hooks *g*. The inner ends of these radiating chains F F G G are connected to a ring H, having raised portions *h*, passing through the end links of said chains, said ring being in turn carried by the pad E and fixedly secured centrally of said pad through the medium of a leather or other disk *e*, perforated, as at *e'*, for the raised or arched portions *h* of the ring, those portions of the disk intermediate the apertures being seated over the ring between said arched portions thereof and the disk being securely stitched to the underlying portions of the pad, whereby the ring is held against displacement and the whole of the pad structure made firm and durable. The under layer of the pad may be of any relatively soft substance, such as felt or wool. I represents additional chains, which when in use approximate a vertical position and are arranged slightly forward of the pad E and run from the chains G to the trace-chains D, one of these chains I being provided at each side of the harness and their lower ends being adjustably and detachably secured to the trace-chains by means of double snap-hooks *i*, a useful function of such vertical chains being to support the trace-chains when they are slackened, as when the animal is at a standstill.

By using chains in this structure it will be appreciated that the many disadvantages incident to the use of leather, such as breakage due to rottenness from dampness, and its relatively difficult repair are overcome. That the chains may be easy on the back of animals they are preferably covered with a flexible sheathing J.

I claim—

1. In a harness of the character described, a back-pad, connecting-chains radiating therefrom, and means for securing the chains to the back-bad including a ring embedded therein having arched exposed portions and means carried by the chains engaging said arched exposed portions.

2. A harness device of the character described, comprising a pad, and a ring secured thereto having portions arched above the plane of the pad.

In testimony whereof I affix my signature in presence of two witnesses.

JOHN POEHLMAN

Witnesses:
   JOHN W. GOLDEN,
   ALBERT REILLY.